(12) United States Patent
Kuninsky

(10) Patent No.: US 8,456,994 B2
(45) Date of Patent: Jun. 4, 2013

(54) TRANSMIT REQUEST MANAGEMENT IN A DISTRIBUTED SHARED STORAGE SYSTEM

(75) Inventor: Mitch Kuninsky, Woburn, MA (US)

(73) Assignee: Avid Technology, Inic., Burlington, MA (US)

( * ) Notice: Subject to any disclaimer, the term of this patent is extended or adjusted under 35 U.S.C. 154(b) by 1028 days.

(21) Appl. No.: 11/524,999

(22) Filed: Sep. 21, 2006

(65) Prior Publication Data

US 2007/0136484 A1 Jun. 14, 2007

Related U.S. Application Data

(60) Provisional application No. 60/748,838, filed on Dec. 9, 2005, provisional application No. 60/748,840, filed on Dec. 9, 2005.

(51) Int. Cl.
*G01R 31/08* (2006.01)
*H04L 12/28* (2006.01)

(52) U.S. Cl.
USPC .......................................... 370/235; 370/412

(58) Field of Classification Search
None
See application file for complete search history.

(56) References Cited

U.S. PATENT DOCUMENTS

| | | | | |
|---|---|---|---|---|
| 4,998,247 | A * | 3/1991 | Irvine-Halliday et al. | 370/407 |
| 6,034,962 | A * | 3/2000 | Ohno et al. | 370/399 |
| 6,466,580 | B1 * | 10/2002 | Leung | 370/412 |
| 6,934,250 | B1 * | 8/2005 | Kejriwal et al. | 370/229 |
| 2002/0150045 | A1 * | 10/2002 | Vogtmeier et al. | 370/229 |
| 2003/0202525 | A1 * | 10/2003 | Nagatomo | 370/411 |
| 2003/0231594 | A1 * | 12/2003 | Xu et al. | 370/236 |
| 2005/0138243 | A1 * | 6/2005 | Tierney et al. | 710/52 |
| 2005/0232155 | A1 * | 10/2005 | Morikawa et al. | 370/235 |
| 2007/0076605 | A1 * | 4/2007 | Cidon et al. | 370/230 |

* cited by examiner

*Primary Examiner* — Jutai Kao
(74) *Attorney, Agent, or Firm* — Oliver Strimpel

(57) ABSTRACT

If a distributed shared storage system is used to provide high bandwidth real-time media data that is shared by a large number of users, several complexities arise. In such an application, the high bandwidth real-time media data is distributed among multiple storage devices or servers. Multiple client applications or machines may access the data. To access the data, clients and servers communicate among themselves using short control messages that contain queries and responses, and using longer data messages that contain media data. To reduce this variability in latency, short control messages are posted for transmission immediately, whereas long messages are posted for transmission in a controlled fashion. For example, the number of long messages that may be outstanding at any one time may be limited. Thus, a long message is not posted to the transmit queue if the maximum number of long messages has been reached. A long message may be posted when transmission of an outstanding long message has been completed. In this way, the latency for any short message is limited by the amount of time it takes to send a long message and the number of long messages that are permitted to be outstanding at any one time.

6 Claims, 2 Drawing Sheets

TRANSMIT REQUEST MANAGEMENT IN A DISTRIBUTED SHARED STORAGE SYSTEM

CROSS-REFERENCE TO RELATED APPLICATIONS

This application claims the benefit of priority to U.S. provisional patent application Ser. Nos. 60/748,838 entitled "Transmit Request Management in a Distributed Shared Storage System" and 60/748,840 entitled "Distribution of Data in a Distributed Shared Storage System", each filed on 9 Dec. 2005. This application is related to non-provisional patent application Ser. No. 11/524,678 entitled "Highly-Available Blade-Based Distributed Computing System" and Ser. No. 11/524,666 entitled "Distribution of Data in a Distributed Shared Storage System", each filed 21 Sep. 2006. The contents of all of the aforementioned applications are incorporated herein by reference.

BACKGROUND

Distributed computing architectures enable large computational and data storage and retrieval operations to be performed by a number of different computers, thus reducing the time required to perform these operations. Distributed computing architectures are used for applications where the operations to be performed are complex, or where a large number of users are performing a large number of transactions using shared resources. A distributed shared storage system is a kind of distributed computing architecture.

If a distributed shared storage system is used to provide high bandwidth real-time media data that is shared by a large number of users, several complexities arise. In such an application, the high bandwidth real-time media data is distributed among multiple storage devices or servers. Multiple client applications or machines may access the data. To access the data, clients and servers communicate among themselves using short control messages that contain queries and responses, and using longer data messages that contain media data.

As an example, blocks of data may be read by a client by having the client first transmit a read request message to a server. The server may send an acknowledgment confirming the availability of the requested data. After receiving an acknowledgment, a client may send a read message to the server and receive data packets. A client also may write data to a server. It may send a write request message to a server and receive an acknowledgement confirming the availability of the server to store the data. The client then may send a write message to the server with the data to be written. On both the server and the client, a network interface generally maintains a queue of requests from applications to transmit various messages, called the transmit queue. The transmit requests in the transmit queue generally are placed in the transmit queue in the order that an application or applications submit messages for transmission.

The User Datagram Protocol (UDP) is commonly used for transmission over Ethernet for real-time data because it requires significantly less overhead, and thus better utilization of network bandwidth, than TCP/IP. However, UDP commonly uses a single transmit queue. Transmit requests are added at the end of this transmit queue.

SUMMARY

The queuing by a network interface of transmit requests from applications results in latency between the time an application issues a request to transmit a message and the time that message is sent by the network interface. If a system uses long messages containing media data and short messages containing control information on the same network, both the average latency and the variability in the latency increase in comparison to a system that has only short messages or only long messages. The increased variability in the latency significantly impacts the ability of an application to operate in real time if its real time behavior is based on the control information obtained by communicating with other parts of the system.

To reduce this variability in latency, short control messages are posted for transmission immediately, whereas long messages are posted for transmission in a controlled fashion. For example, the number of long messages that may be outstanding at any one time may be limited. Thus, a long message is not posted to the transmit queue if the maximum number of long messages has been reached. A long message may be posted when transmission of an outstanding long message has been completed. In this way, the latency for any short message is limited by the amount of time it takes to send a long message and the number of long messages that are permitted to be outstanding at any one time.

An example implementation using the user datagram protocol (UDP) involves managing the single transmit queue in the UDP driver. An additional controller at the application level can receive all requests for transmission of data then post all short messages to the transmit queue immediately when received, but can post long messages to the transmit queue in a controlled fashion. For example, long messages may be posted to the transmit queue only after an acknowledgment is received indicating completion of any prior long message. Alternatively, the UDP driver could be modified so as to modify its queue to permit either separate queuing of long and short messages or placement of short messages at the beginning of its queue, or other effective queuing method that achieves the same result. Similar queuing methods could be applied to other communication protocols.

DETAILED DESCRIPTION

Figure 1:
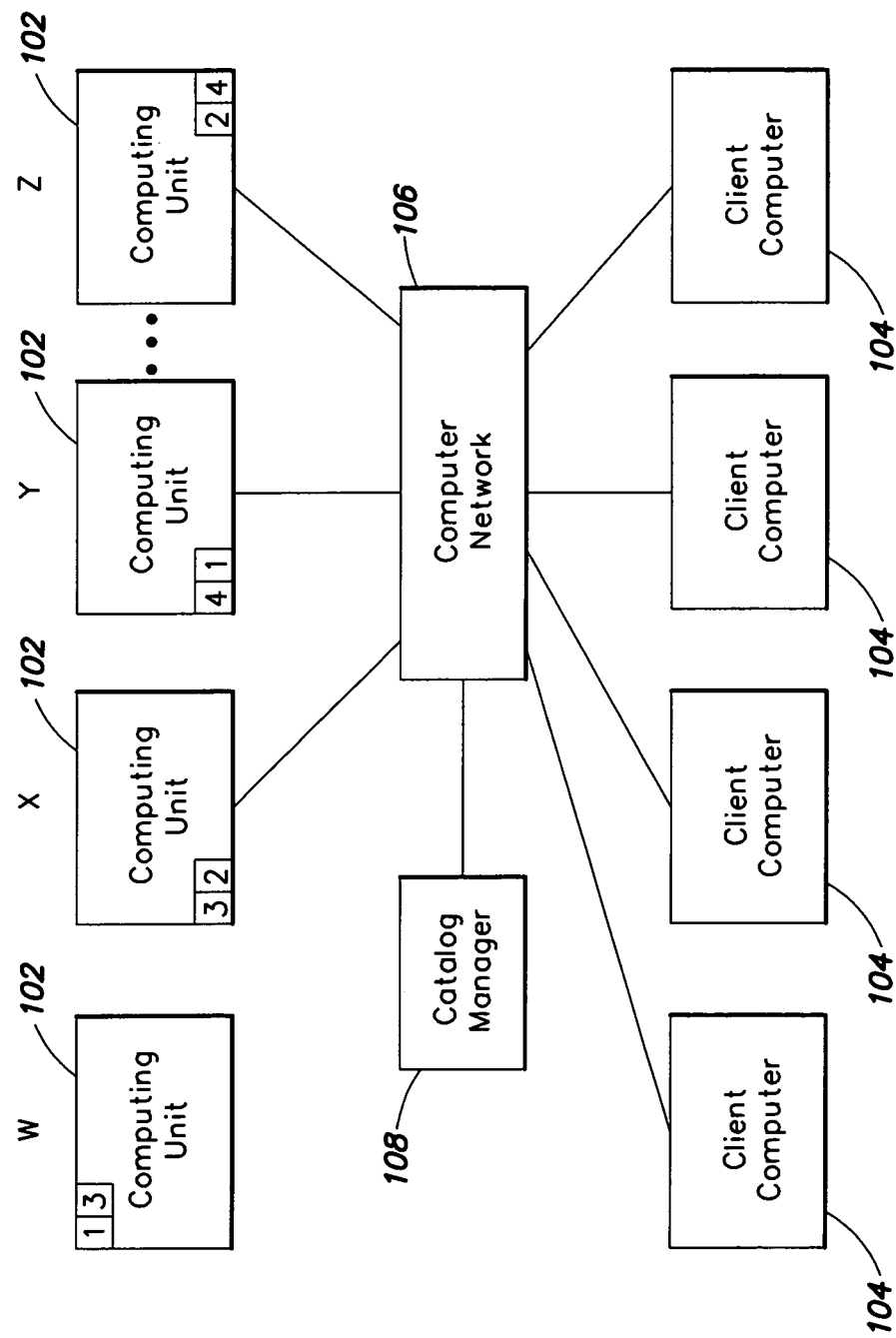
FIG. 1 is a block diagram of an example distributed computing system.

FIG. 1 illustrates an example distributed computer system 100. The computer system 100 includes a plurality of computing units 102. There may be an arbitrary number of computing units 102 in the computer system 100. The computing units 100 are interconnected through a computer network 106 which also interconnects them with a plurality of client computers 104.

Each computing unit 102 is a device with a nonvolatile computer-readable medium, such as a disk, on which data may be stored. The computing unit also has faster, typically volatile, memory into which data is read from the nonvolatile computer-readable medium. Each computing unit also has its own processing unit that is independent of the processing units of the other computing units, which may execute its own operating system, such as an embedded operating system, e.g., Windows XP Embedded, Linux and VxWorks operating systems, and application programs. For example, the computing unit may be implemented as a server computer that responds to requests for access, including but not limited to read and write access, to data stored on its nonvolatile computer-readable medium either a raw data blocks or in one or more data files in the file system of its operating system. A computing unit may perform other operations in addition to data storage and retrieval, such as a variety of data processing operations.

Client computers 104 also are computer systems that communicate with the computing units 102 over the computer network 106. Each client computer may be implemented using a general purpose computer that has its own nonvolatile storage and temporary storage, and its own processor for executing an operating system and application programs. Each client computer 104 may be executing a different set of application programs and/or operating systems.

An example application of the system shown in FIG. 1 for use as a distributed, shared file system for high bandwidth media data will now be described. Such an application is described in more detail in U.S. Pat. No. 6,785,768. The computing units 102 may act as servers that deliver data to or receive data from the client computers 104 over the computer network 106, Client computers 104 may include systems which capture data received from a digital or analog source for storing the data on the storage units 102. Client computers 104 also may include systems which read data from the storage units, such as systems for authoring, processing or playback of multimedia programs, including, but not limited to, audio and video editing. Other client computers 104 may perform a variety of fault recovery tasks. For a distributed file system, one or more client computers may be used to implement one or more catalog managers 108. A catalog manager is a database, accessible by the client computers 104, that maintains information about the data available on the computing units 102. This embodiment may be used to implement a broadcast news system such as shown in PCT Publication WO97/39411, dated 23 Oct. 1997. A blade-server based implementation of the computing units 102 is described in U.S. Provisional Patent Application 60/720,152, entitled "Highly-Available Blade-Based Distributed Computing System," filed on 23 Sep. 2005, and U.S. patent application Ser. No. 11/524,678 having the same title filed on 21 Sep. 2006, both of which are hereby incorporated by reference.

In one embodiment of such a distributed, shared file system the data of each file is divided into segments. Redundancy information for each segment is determined, such as a copy of the segment. Each segment and its redundancy information are stored on the storage of different computing units. The selection of a computing unit on which a segment, and its redundancy information, is stored according to any sequence of the computing units that provides a non-sequential distribution if the pattern of distribution is different from one file to the next and from the file to its redundancy information. For example, this sequence may be random, pseudorandom, quasi-random or a form of deterministic sequence, such as a permutation. An example distribution of copies of segments of data is shown in FIG. 1. In FIG. 1, four computing units 102, labeled w, x, y and z, store data which is divided into four segments labeled 1, 2, 3 and 4. An example distribution of the segments and their copies is shown, where: segments 1 and 3 are stored on computing unit w; segments 3 and 2 are stored on computing unit x; segments 4 and 1 are stored on computing unit y; and segments 2 and 4 are stored on computing unit z. More details about the implementation of such a distributed file system are described in U.S. Pat. No. 6,785,768, and U.S. Provisional Patent Application entitled "Distribution of Data in a Distributed Shared Storage System," filed on even date herewith, which are hereby incorporated by reference.

The foregoing system is particularly useful in implementing a highly available, distributed, shared file system for supporting high bandwidth temporal media data, such as video and audio data, that is captured, edited and played back in an environment with a large number of users.

To access the data, clients and servers communicate among themselves using short control messages that contain queries and responses, and using longer data messages that contain media data.

As an example, media data may be read by a client by having the client first transmit a read request message to a server. The server may send an acknowledgment confirming the availability of the requested media data. After receiving an acknowledgment, a client may send a read message to the server and receive data packets containing the media data. A client also may write media data to a server. It may send a write request message to a server and receive an acknowledgement confirming the availability of the server to store the media data. The client then may send a write message to the server with the media data to be written. On both the server and the client, a network interface generally maintains a queue of requests from applications to transmit various messages, called the transmit queue. The transmit requests in the transmit queue generally are placed in the transmit queue in the order that an application or applications submit messages for transmission.

To reduce this variability in latency, short control messages are posted for transmission immediately, whereas long messages are posted for transmission in a controlled fashion. For example, the number of long messages that may be outstanding at any one time may be limited. Thus, a long message is not posted to the transmit queue if the maximum number of long messages has been reached. A long message may be posted when transmission of an outstanding long message has been completed. In this way, the latency for any short message is limited by the amount of time it takes to send a long message and the number of long messages that are permitted to be outstanding at any one time.

Figure 2:
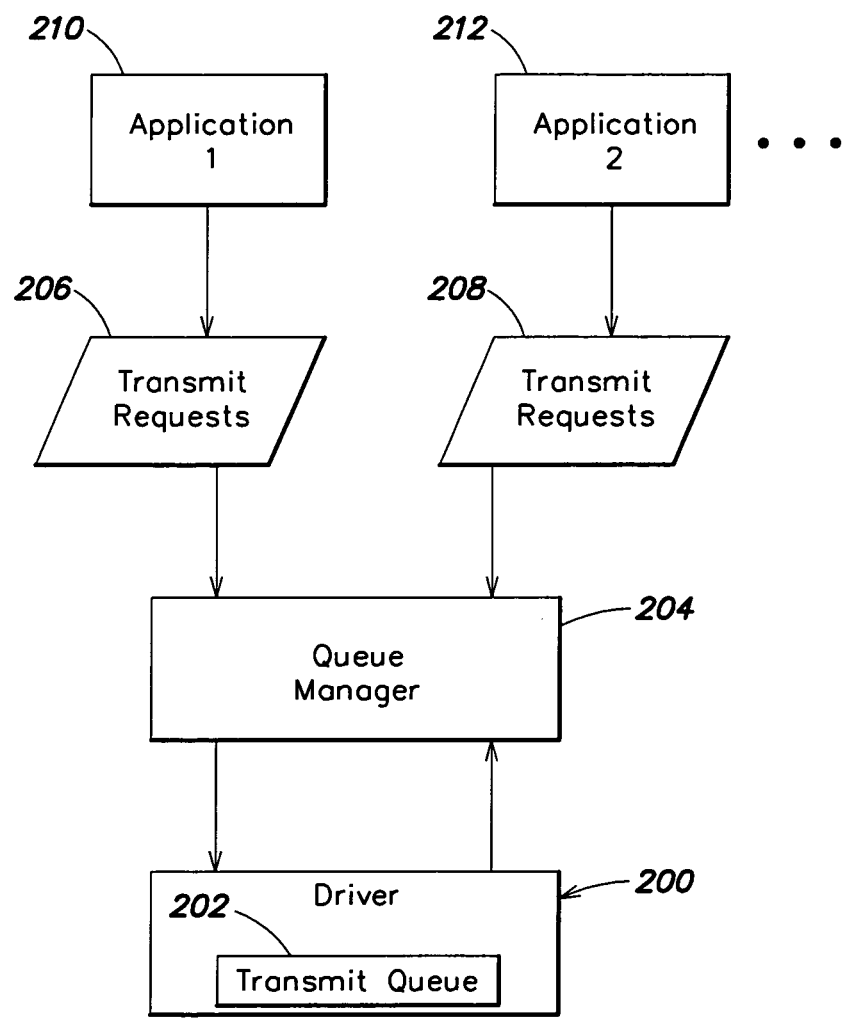
FIG. 2 is a block diagram of an example implementation of a queue manager that controls posting of messages to a transmit queue of a network interface.

An example implementation uses the user datagram protocol (UDP), and will be described in connection with FIG. 2. The single transmit queue 202 in the UDP driver 200 is managed by a queue manager 204 at the application level. The queue manager receives all transmit requests 206 and 208 for transmission of data from applications 210, 212, etc. The queue manager posts all short messages to the transmit queue 202 immediately when received, but posts long messages to the transmit queue in a controlled fashion. For example, long messages may be posted to the transmit queue only after an acknowledgment is received indicating completion of any prior long message, if only one outstanding long message is permitted at a time. Multiple long messages may be permitted to be outstanding at any given time. In such a case, the queue manager posts a long message to the queue unless the maximum number of long messages is already in the queue. If the maximum number of long messages is already in the queue then the queue manager holds long messages until transmission of one of the already outstanding long messages is completed. Alternatively, the UDP driver could be modified so as to modify its queue to permit either separate queuing of long and short messages or placement of short messages at the beginning of its queue, or other effective queuing method that achieves the same result. Similar queuing methods could be applied to other communication protocols.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A system for transmitting messages over a network between a client computer and one or more server computers that store media data, such transmission using a protocol involving short control messages for communicating queries and responses and long data messages including media data, comprising:
    a queue in a network interface of the client computer for storing transmit requests from applications on the client computer for short control messages and long data messages prior to transmission over the network of the messages from the client computer to one of the server computers; and
    a queue manager in the client computer configured to:
    add short control messages to the end of the queue when the application submits a short control message;
    if a number of long data messages in the queue does not exceed a maximum number of long data messages, post a long data message to the end of the queue when the application submits the long data message; and
    if the number of long data messages in the queue exceeds the maximum number of long data messages, hold a long data message when the application submits the long data message until transmission of a previously posted long data message in the queue is completed, and then post the long data message to the end of the queue.

2. A method of transmitting messages over a network between a client computer and one or more server computers that store media data, such transmission using a protocol involving short control messages for communicating queries and responses and long data messages including media data; comprising:
    providing a queue in a network interface in the client computer for transmit requests from applications on the client computer for short control messages and transmit requests from applications on the client computer for long data messages prior to transmission over the network of the messages from the client computer to one of the server computers;
    receiving transmit requests from applications on the client computer for short control messages and posting the transmit requests for short control messages to the end of the queue when received; and
    receiving transmit requests from applications on the client computer for long data messages;
    posting a received long data message transmit request to the end of the queue when received, if a maximum number of long data messages in the queue is not exceeded; and
    if the maximum number of long data messages in the queue is exceeded, then holding the received long data message transmit request until transmission of a previously posted long data message in the queue is completed, and then posting the long data message to the end of the queue.

3. A system for transmitting messages over a network between a client computer and one or more server computers that store media data, such transmission using a protocol involving short control messages for communicating queries and responses and long data messages including media data, comprising:
    one or more applications on the client computer that generate short control messages for communicating queries and responses to one or more of the server computers and long data messages for communicating media data to one or more of the server computers;
    a queue, in a network interface of the client computer, configured to store transmit requests from applications on the client computer, for short control messages and for long data messages prior to transmission over the network of the messages; and
    a queue manager, in the client computer, configured to:
    add short control messages to the end of the queue when the application submits a short control message;
    if a number of long data messages in the queue does not exceed a maximum number of long data messages, post a long data message to the end of the queue when the application submits the long data message: and
    if the number of long data messages in the queue exceeds the maximum number of long data messages, hold a long data message when the application submits the long data message until transmission of a previously posted long data message in the queue is completed, and then post the long data message to the end of the queue.

4. A system for transmitting messages over a network between a client computer and one or more server computers that store media data, such transmission using a protocol involving short control messages for communicating queries and responses and long data messages including media data, comprising:
    a queue in a network interface of at least one of the one or more server computers for storing transmit requests from applications on the one or more server computers for short control messages and long data messages prior to the server initiating transmission of the messages over the network from the at least one server computer to the client computer; and
    a queue manager in the at least one of the one or more server computers configured to:
    add short control messages to the end of the queue when the application submits a short control message; and
    if a number of long data messages in the queue does not exceed a maximum number of long data messages, post a long data message to the end of the queue when the application submits the long data message; and
    if the number of long data messages in the queue exceeds the maximum number of long data messages, hold a long data message when the application submits the long data message until transmission of a previously posted long data message in the queue is completed, and then post the long data message to the end of the queue.

5. A method of transmitting messages over a network between a client computer and one or more server computers that store media data, such transmission using a protocol involving short control messages for communicating queries and responses and long data messages including media data, comprising:
    providing a queue in a network interface in at least one of the one or more server computers for transmit requests from, applications on the one or more server computers for short control messages and transmit requests from applications on the one or more server computers for long data messages prior to the server computer initiating transmission of the messages over the network from the at least one server computer to the client computer;
    receiving transmit requests from applications on the at least one server computer for short control messages and posting the transmit requests for short control messages to the end of the queue when received; and
    receiving transmit requests from applications on the at least one server computer for long data messages;

posting a received long data message transmit request to the end of the queue when received, if a maximum number of long data messages in the queue is not exceeded; and if the maximum number of long data messages in the queue is exceeded, then holding the received long data message transmit request until transmission of a previously posted long data message in the queue is completed, and then posting the long data message to the end of the queue.

6. A system for transmitting messages ever a network between a client computer and one or more server computers that store media data, such transmission using a protocol involving short control messages for communicating queries and responses and long data messages including media data, comprising:

one or more applications on at least one of the server computers that generate short control messages for communicating queries and responses to the client computer and long data messages for communicating media data to the client computer;

a queue, in a network interface in the at least one of the server computers, configured to store transmit requests from applications on the server computer, for short control messages and for long data messages prior to the server computer initiating transmission of the messages over the network; and a queue manager, in the at least one of the server computers, configured to:

add short control messages to the end of the queue when the application submits a short control message; and if a number of long data messages in the queue does not exceed a maximum number of long data messages, post a long data message to the end of the queue when the application submits the long data message; and if the number of long data messages in the queue exceeds the maximum number of long data messages hold a long data message when the application submits the long data message until transmission of a previously posted long data message in the queue is completed, and then post the long data message to the end of the queue.

* * * * *